UNITED STATES PATENT OFFICE.

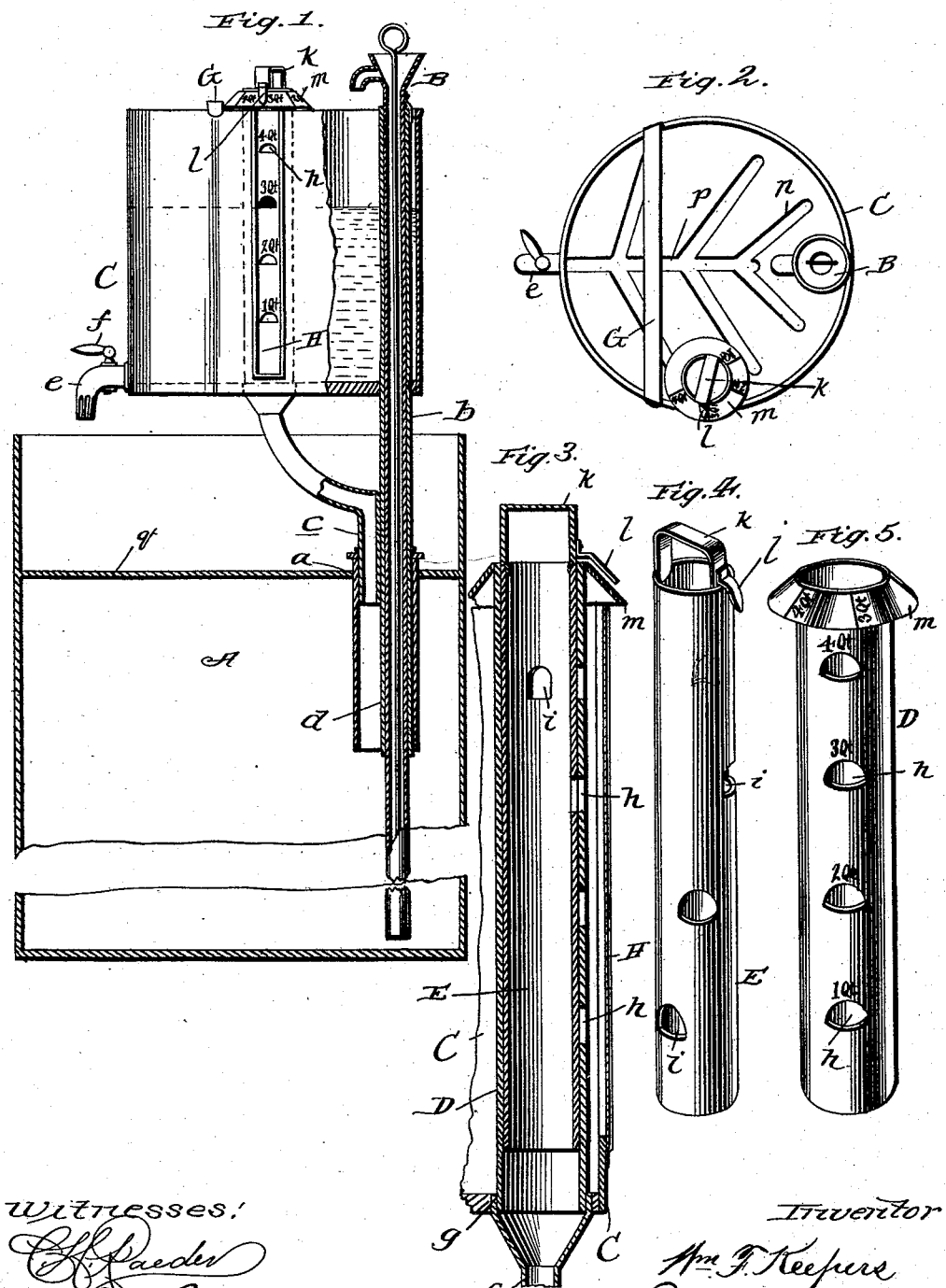

WILLIAM F. KEEPERS, OF PHILADELPHIA, PENNSYLVANIA.

MEASURING-VESSEL.

SPECIFICATION forming part of Letters Patent No. 524,206, dated August 7, 1894.

Application filed April 13, 1894. Serial No. 507,493. (No model.)

*To all whom it may concern:*

Be it known that I, WILLIAM F. KEEPERS, a citizen of the United States, residing at Philadelphia, in the county of Philadelphia and State of Pennsylvania, have invented certain new and useful Improvements in Graduated Self-Measuring Vessels; and I do declare the following to be a full, clear, and exact description of the invention, such as will enable others skilled in the art to which it appertains to make and use the same.

This invention has relation to an improvement in graduated self measuring vessels to be used in connection with a pump for measuring oil and other liquids, and it has for its prime object to improve that class of devices by rendering the operation more simple and convenient, and adapting the parts for use so that there will be measured each time only the quantity desired, thereby leaving the measuring vessel empty and free after the quantity desired has been drawn and placed in the bottle, jug, or other vessel to receive it, without necessitating the holding of any surplus in the measuring vessel.

Other objects and advantages will appear from the following description and claims when taken in connection with the annexed drawings, in which—

Figure 1, is a side elevation of my improved device showing the same applied to a pump and a tank or reservoir in vertical section with the measuring vessel also partly in section and partly broken away. Fig. 2, is a plan view of the device removed from the tank. Fig. 3, is a vertical, sectional view of the graduated cylinder and rotatable cylinder therein applied to the vessel. Fig. 4, is a perspective view of the inner rotatable cylinder, and Fig. 5, is a similar view of the outer graduated cylinder.

Referring by letter to said drawings:—A, indicates an oil tank, and B, a pump, which may be of the character usually employed, and used in grocery stores and other places for dispensing oils and other liquids. The tank is provided in the top with an aperture *a*, through which the stock or tube *b*, of the pump passes, and this aperture is sufficiently large to receive the return or discharge pipe *c*, of the measuring vessel, as will be presently described, although in some cases, a separate aperture may if desired, be provided for this tube or pipe *c*.

C, indicates the measuring vessel. This vessel may be of any suitable capacity; the one here shown being of a capacity to measure from one quart to a gallon. This vessel is provided with a vertical fixed tube or way *d*, for the passage of the pump tube, and this way should be so constructed as to permit no leakage from the vessel. The vessel is furthermore provided with a draw off nozzle *e*, which may have its discharge end corrugated as shown, and carries a cock *f*, for regulating the discharge.

In the bottom of the vessel is an aperture *g*, and arranged in a fixed position over this aperture is a vertically-disposed tube D. This tube which is fixed over said aperture so as to permit no leakage at the joint, is provided in one side with a vertical series of holes or apertures *h*, and these holes are so graduated as to indicate the quantity of liquid to be measured. In the illustration, the lowermost hole or aperture is marked 1 qt. indicating that when the liquid rises in the vessel C, to this lower hole or aperture *h*, there will be exactly one quart in the vessel, and should the pumping operation be continued, when the measure has been set to measure a quart as presently described, all over that amount as it rises in the vessel will enter said hole or aperture and be conducted back to the can or reservoir, as will presently appear.

E, indicates a rotatable or semi-rotatable cylinder, arranged within the apertured and graduated cylinder valve. This inner cylinder valve is provided with lateral holes or apertures *i*, which are arranged spirally and at altitudes corresponding with those in the outer fixed cylinder. This inner cylinder valve which may be open at its top as well as at its bottom, is provided with a handle *k*, so as to permit of a convenient grasp by the operator and is furthermore provided at its upper end or on the handle with a pointer *l*.

The outer cylinder D, is provided at its upper open end and externally, with a flange *m*, which is also graduated as shown to correspond with the graduations above the vertical series of holes or apertures in the side of the cylinder, and both of these cylinders extend to a point above the upper edge of the vessel, or sufficiently high that when the inner rotatable cylinder valve is open at its upper end, the liquid cannot rise in the vessel and pass into the upper end of the cylinder valve.

Leading from the bottom of the measuring vessel and communicating with the graduated cylinder therein, is the pipe or tube c, which has its opposite end leading into the tank, reservoir, or other vessel upon which it may be placed, so as to return any surplus of liquid from the measure, back to the main supply.

In order that the measuring vessel may be thoroughly drained of its contents, I have provided the bottom on its inner side with a number of grooves n, leading into a main groove p, and all are slightly pitched toward the draw-off cock or nozzle e, so that no oil or other liquid will be allowed to remain in the vessel after use.

Ordinarily the measuring vessel will be left open at the top for measuring oil and when placed in the regulation oil can or with the regulation pump, it can be covered when not in use by the cover of said tank, but if desired, the measure itself may be provided with a cover, and it is desirable that it should be when used for measuring some liquids.

The measure is provided with a handle G, so that it may be raised or lowered with respect to the tank.

In operation, a jug, bottle, or other article to receive the measured liquid is placed upon the top or platform q, of the tank or reservoir and beneath the discharge nozzle of the measure. The measure is arranged at a height sufficient to permit a jug or other article holding the greatest quantity of the measure, to be placed below the nozzle, but should it become necessary to raise the measuring vessel to accommodate a very tall jug, it is simply necessary to grasp the handle G, drawing up the same and with it the tube or pipe c, without entirely removing said pipe from the hole or aperture in the top of the tank.

To measure a desired quantity of liquid with my improved device it is simply necessary to turn the cylinder valve E, so as to bring the proper aperture i, thereof opposite the corresponding aperture h, in the cylinder D, when all the other apertures in said cylinder B, will be closed, by reason of the apertures i, of the valve E, being arranged in a spiral manner as described. When two apertures of the cylinders D, E, (the "one quart" apertures for instance) are made to register, the pump is worked to raise and discharge liquid into the measuring vessel C, and when this is done, the liquid will rise in the vessel C, until it reaches the height of the "one quart" apertures, when it will commence to flow through the registered apertures h, i, the cylinder valve E, and the tube or pipe c, back into the tank A. The vessel C, is of such a size that when the liquid rises to the height of the lowermost apertures h, i, it will amount to one quart, and it will therefore be seen that when the lowermost apertures h, i, are registered, no matter how much the pump is worked, only one quart of the liquid will remain in the vessel C, to be drawn out of the spout e. The vessel C, is also of such a size that when the liquid rises to the height of the "two quart" apertures, it will amount to two quarts, while when it rises to the height of the "three quart" and "four quart" apertures, it will amount to three quarts and four quarts, respectively.

In measuring some liquids which evaporate readily, the measure may be provided with a cover and in such cases, it might be preferable to employ a sight glass H, in the side of the measure so as to inspect the contents although such glass is not essential to the invention. The tubes having the apertures may be placed at any suitable point in the measure and the measure may be either round, square or polygonal, and in practice I would employ a gauze or strainer within the measure at the discharge nozzle so as to prevent the passage of any impurities or foreign matter.

Having described my invention, what I claim is—

1. The combination with a tank or reservoir; of a pump, a measuring vessel adapted to receive from the pump and having a draw-off nozzle, a vertically disposed graduated tube with lateral apertures arranged in the measuring vessel, a rotatable tube having a corresponding number of apertures arranged spirally and placed in the graduated tube, a pipe or tube leading from the bottom of the graduated tube, and adapted to enter the tank or reservoir, the outer tube having a flange at its upper end provided with graduations indicative of the apertures in said tube, and the rotatable tube having the pointer adapted to move around the graduated flange, substantially as specified.

2. In a device of the character described, the combination with the measuring vessel adapted to receive from a pump, of a tube having a vertical series of apertures, and fixed within the vessel and also having a flange at its upper end provided with graduations indicative of the apertures, a pipe or tube leading from this apertured tube to a suitable point of discharge, and a rotatable tube arranged within the first named tube and having apertures arranged spirally of its length and at altitudes corresponding with those of the outer tube, and also having a handle and a pointer adapted to move around or over the graduated flange of the outer tube, substantially as specified.

3. The combination with an oil can or reservoir and a pump leading from the reservoir, a measuring vessel adapted to receive from the pump and having a discharge aperture in its bottom, and also having the grooves in its bottom and the handle at its top, the tube fixed in the vessel and over the aperture in its bottom and having the vertical series of holes or apertures and the graduated flange at its upper end, the inner rotatable tube having a handle at its upper end, a pointer adapted to move over the graduated flange of the outer tube, and also having a number of apertures corresponding to those of the outer tube and arranged spirally, substantially as specified.

In testimony whereof I affix my signature in presence of two witnesses.

WILLIAM F. KEEPERS.

Witnesses:
GEO. W. CLEMENT,
JOS. McKNIGHT.